United States Patent [19]

Hambleton

[11] Patent Number: 4,782,616
[45] Date of Patent: Nov. 8, 1988

[54] PORTABLE BLIND APPARATUS FOR OUTDOOR USAGE

[76] Inventor: John D. Hambleton, R.R. 1, Guthrie Center, Iowa 50115

[21] Appl. No.: 130,163

[22] Filed: Dec. 8, 1987

[51] Int. Cl.$^4$ ............................................. A01M 31/02
[52] U.S. Cl. ............................................................ 43/1
[58] Field of Search ............................. 43/1; 135/901

[56] References Cited

U.S. PATENT DOCUMENTS

| | | | |
|---|---|---|---|
| 2,783,766 | 3/1957 | Kohlbeck | 135/1 |
| 3,220,766 | 11/1965 | Kates | 297/184 |
| 3,513,605 | 5/1970 | Smith | 43/1 |
| 3,540,170 | 11/1970 | Flowers | 43/1 |
| 3,609,905 | 10/1971 | Fuhrman | 43/1 |
| 3,622,201 | 11/1971 | Radig | 43/1 |
| 3,848,352 | 11/1974 | Sayles | 43/1 |
| 3,886,678 | 6/1975 | Caccamo | 43/1 |
| 3,902,264 | 9/1975 | Radig | 43/1 |
| 4,045,040 | 8/1977 | Fails | 43/1 |
| 4,224,754 | 9/1980 | Derryberry | 43/1 |
| 4,364,193 | 12/1982 | Visco | 43/1 |
| 4,412,398 | 11/1983 | Harmon | 43/1 |

OTHER PUBLICATIONS

Fall Savings Catalog entitled Gander Mountain, Inc. (for 1987), p. 56—3—Person He—agon Dome Tents (copy of page).
Fall Savings Catalog entitled Gander Mountain, Inc. (for 1987), p. 58—The Chair Pack (copy of page).

Primary Examiner—Gene P. Crosby
Attorney, Agent, or Firm—Henderson & Sturm

[57] ABSTRACT

A portable blind for observing, photographing or hunting birds and animals in their natural habitat which includes a chair and pack frame connected together whereby the blind can be disassembled and packed with the pack frame to the place wherein it is to be used. The chair has a base which allows it to pivot about 360° and a cover extends over and around the chair and is held in place by a hoop structure at the bottom and structure extending upwardly from the pack frame and above the chair. An opening in the front of the cover allows the user to see through the cover. By shuffling one's feet along the ground, the user can pivot the entire blind about 360° to observe birds and animals in any direction from the blind. An optional gun rest table is also provided and is adjustable to accommodate any user.

10 Claims, 3 Drawing Sheets

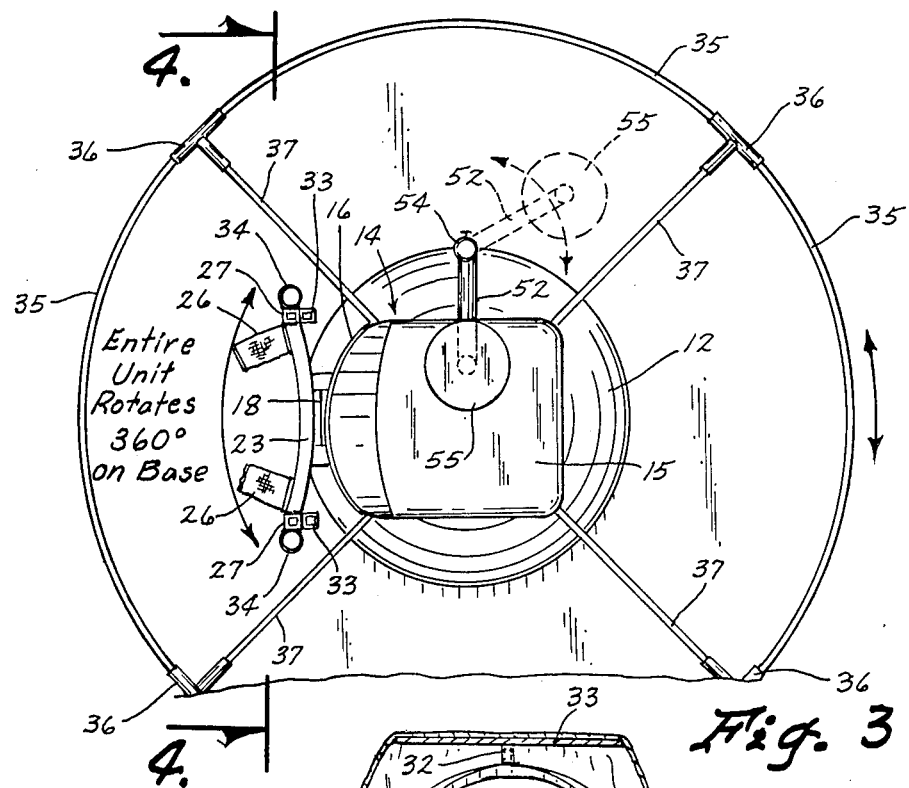
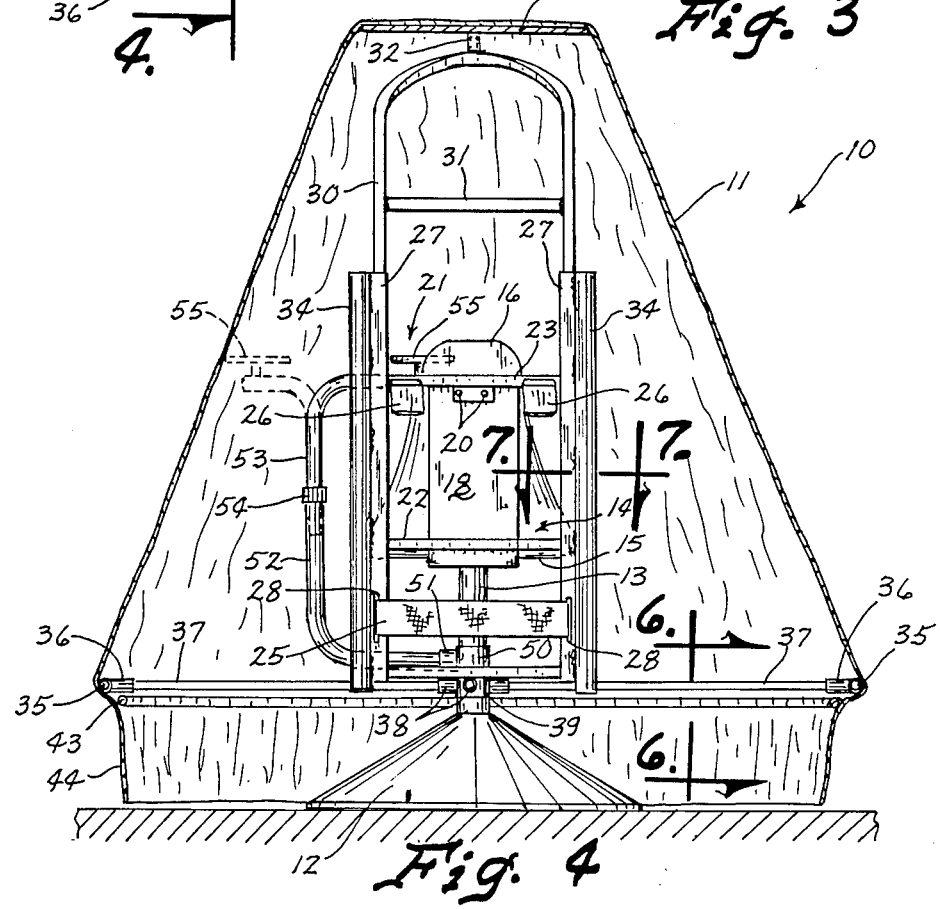

PORTABLE BLIND APPARATUS FOR OUTDOOR USAGE

TECHNICAL FIELD

The present invention relates generally to a blind for observing, photographing, or hunting birds and animals in their natural habitat, and more particularly to such a blind which is highly portable, versatile and comfortable.

BACKGROUND ART

In order to observe, photograph or hunt wild birds and animals in their natural habitat, it is necessary for an observer not to be seen since wild birds and animals are usually startled on seeing a human being or by seeing something which does not naturally fit into their environment.

Ground blinds have been in common usage for centuries and these blinds are typically made by cutting trees, bushes, grasses or the like to generally surround the observer who can peek through the spaces between the foliage. Disadvantages of ground blinds are that they damage the environment, they cannot be easily moved from place to place and they require a great deal of time and effort to construct.

Various portable blinds have been suggested such as those shown in U.S. Pat. Nos. 2,783,766 to Kohlbeck, 3,220,766 to Kates, 3,513,605 to Smith, 3,540,170 to Flowers, 3,622,201 to Radig, 3,848,352 to Sayles, 3,886,678 to Caccamo, 3,902,264 to Radig, 4,224,754 to Derryberry and 4,364,193 to Visco.

The aforementioned patented portable blinds generally either are too bulky to move from place to place or they are very difficult to set up and take down. Furthermore, they are not easily connected to a pack frame and they cannot rotate about 360° without alarming the birds and animals sought to be observed, photographed or hunted.

Still another type of blind is a tree stand which is quite often used for hunting deer. Such tree stands are sometimes permanent wherein nails are used to hold lumber to the tree. Portable stands are also used. While some of these tree stands do not require penetration of the bark, still many of such tree stands at least require penetration of the bark for steps to gain access to such portable stand. Consequently, the environment can be damaged by both permanent and temporary tree stands.

Consequently, there is a need for a portable blind which is light weight and easy to pack to the place of use, is easy to set up and which can be easily rotated about 360° without startling birds or animals being observed in their natural habitat.

DISCLOSURE OF THE INVENTION

The present invention relates generally to a portable blind for observing, photographing or hunting birds and animals in their natural habitat which includes a chair and pack frame connected together whereby the blind can be disassembled and packed with the pack frame to the place wherein it is to be used. The chair has a base which allows it to pivot about 360° and a cover extends over and around the chair and is held in place by a hoop structure at the bottom and structure extending upwardly from the pack frame and above the chair. An opening in the front of the cover allows the user to see through the cover and by shuffling one's feet along the ground, the user can pivot the entire blind about 360° to observe birds and animals from whatever direction they are from the blind. An optional gun rest table is also provided and is adjustable to accommodate any user.

An object of the present invention is to provide an improved blind for observing, photographing or hunting birds and animals in the wild.

A further object of the present invention is to provide a blind which has a pack frame attached thereto and therefore can readily be broken down and packed from place to place.

Another object of the present invention is to provide a blind of the aforementioned type which has a chair inside of a cover whereby the entire chair and cover rotate as a unit so that the user can always see through an opening in the cover directly in front of the chair.

Another object of the present invention is to provide a blind of the aforementioned type which can quickly and easily be set up or taken down.

A further object of the present invention is to provide an adjustable table or gun rest for a blind of the aforementioned type.

A still further object of the present invention is to provide a blind of the aforementioned type which is economical to produce and easy to use.

Other objects, advantages, and novel features of the present invention will become apparent from the following detailed description of the invention when considered in conjunction with the accompanying drawings.

BRIEF DESCRIPTION OF THE DRAWINGS

FIG. 3 is a cross sectional view taken along line 3—3 with the cover removed;

FIG. 4 is a cross sectional view taken along line 4—4 of FIG. 3 with the cover on the blind as shown in FIGS. 1 and 2;

BEST MODE FOR CARRYING OUT THE INVENTION

Figure 1:
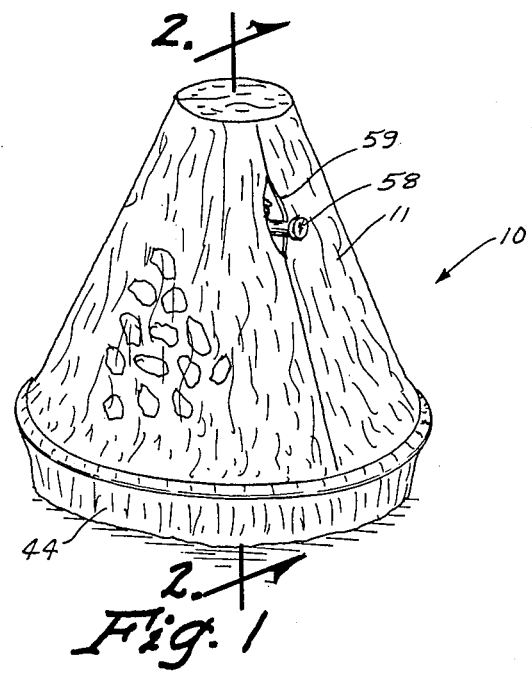
FIG. 1 is a perspective view of a preferred embodiment of the present invention shown in use with a user inside of the blind and extending a camera out through an opening in the cover thereof.

Referring now to the drawings wherein like reference numerals designate identical or corresponding parts throughout the several views, FIG. 1 shows a blind (10) constructed in accordance with the present invention. The blind (10) includes a frusto-conically shaped cloth cover (11) having a camouflage pattern thereon.

Figure 2:
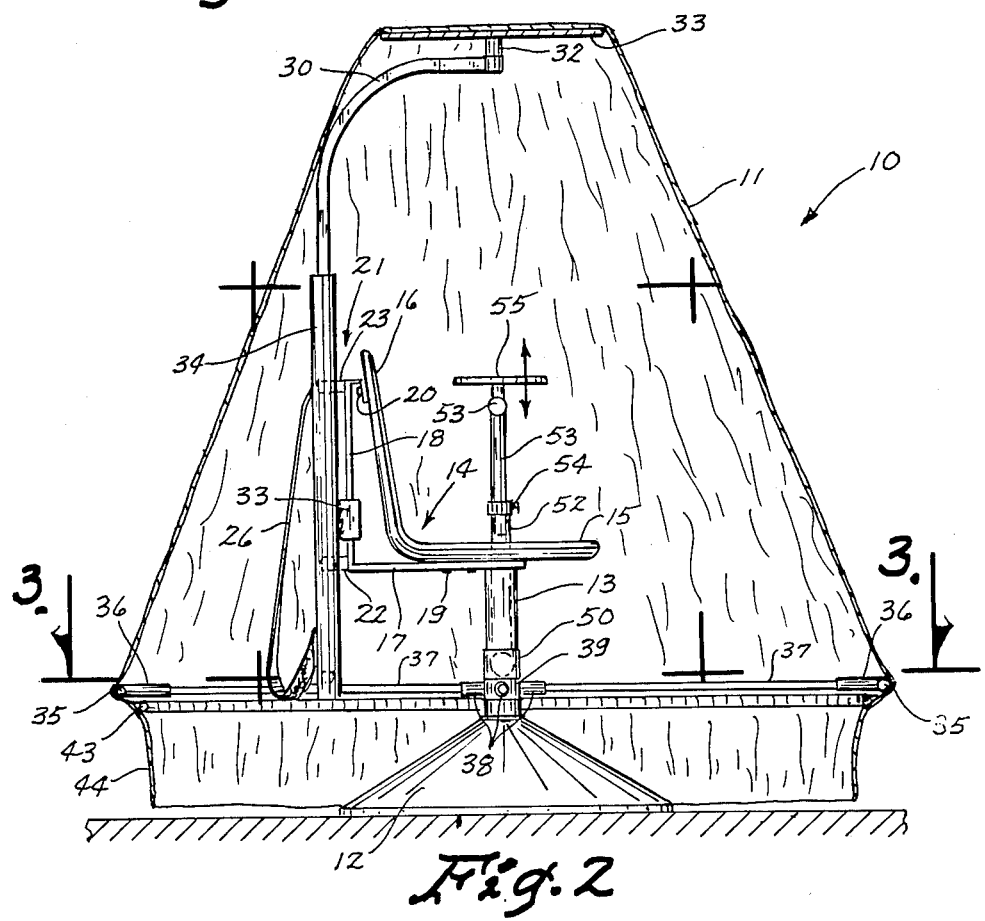
FIG. 2 is a cross sectional view taken along line 2—2 of FIG. 1.

Referring to FIG. 2, it is noted that a solid base (12) has a post (13) rotatably attached thereto and the post (13) has a chair (14) rigidly attached thereto. The chair (14) has a seat portion (15) and a back portion (16) and this chair (14) is preferably molded in one piece from the plastic material. A horizontal bracket (17) rigidly attached to a vertical bracket (18) are bolted to the chair (14) by fasteners (19) and (20).

A pack frame (21) is rigidly connected to the vertical member (18) by rigid connection of member (22) and (23). The pack frame includes a bottom nylon strap (25) and generally vertically oriented straps (26) which are connected at the top thereof to the brace (23) and at the bottom thereof to vertical square tubes (27). It is noted that slots (28) in the bottom of tubes (27) allow the nylon strap (25) to be readily attached thereto.

Figure 7:
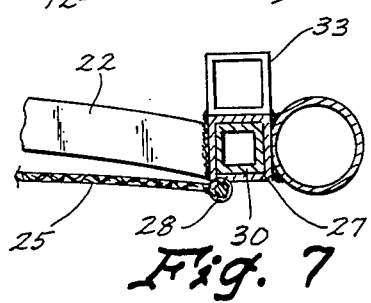
FIG. 7 is an enlarged partial cross sectional view taken along line 7—7 of FIG. 4.

A bent-over A-shaped member (30) is of a size to permit the bottom of the legs thereof to slide into the square tubular members (27) as can readily be seen in FIGS. 2, 4 and 7. Consequently, the A-shaped member (30) will be held in the position shown in FIGS. 2 and 4. A post (32a) on the top of the A-shaped member (30) fits into a sleeve (32) which is rigidly attached to a wooden disk (33) which allows the wooden disk (33) to be rotatably attached to the top of the A-shaped member (30). This structure, including the A-shaped member (30) and the wooden disk (33), holds up the top of the cloth cover (11).

Figure 5:
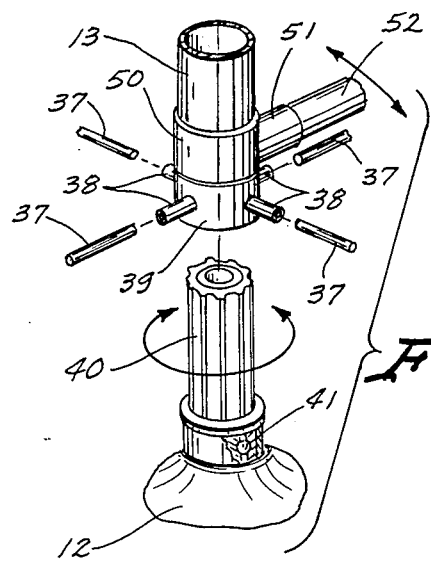
FIG. 5 is an enlarged partial perspective view showing how the base is connected to the chair.
Figure 9:
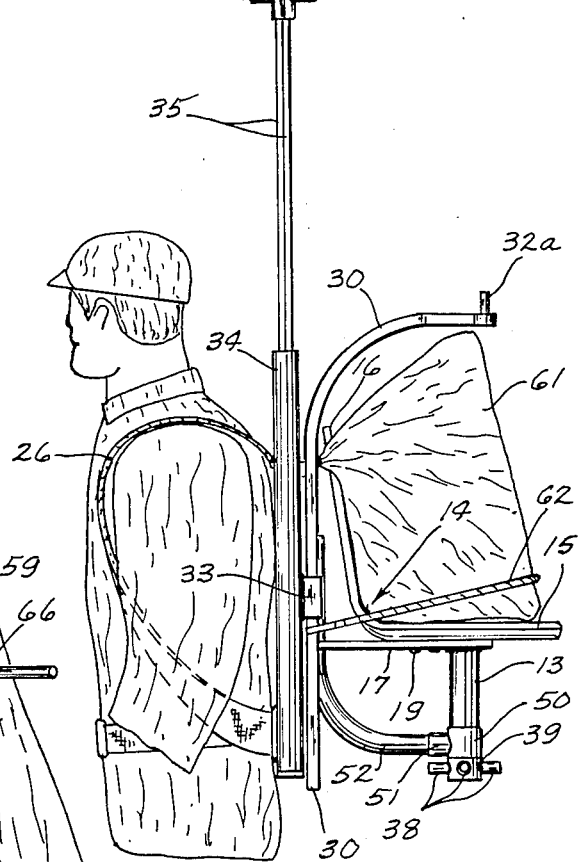
FIG. 9 is a side elevational view of the present invention showing how the pack frame is used to carry the blind from place to place when it is disassembled.

The bottom of the cloth cover (11) is held outwardly from the chair (14) by a hoop structure including four fiberglass rods (35) which are initially straight as shown in FIG. 9 but which can be bent into a circle and connected together by T-connectors (36). The ends of the fiberglass rods (35) can be slipped in to the tubular portions of the T-connector (36) and similarly, braces (37), which are preferably also fiberglass rods, can have the outer ends received in a tubular portion of T-connector (36) and the inner end received in tubular members (38) which are rigidly attached to a sleeve (39) connected to post (13). Referring to FIG. 5, it is noted that if desired, these sleeves (38) could be connected instead permanently to the fiberglass rods (37) and set screws could replace the sleeves (38) to allow for a vertical adjustment of the sleeve (39) with respect to the splined shaft (40), which is rotatably attached by bearings (41) to the base (12). By using set screws instead of sleeves (38), the end having the sleeve (38) attached to the rod (37), the sleeve (38) can slip over the set screws while the set screws can, at other times be tightened or loosened to adjust the height of the chair (14).

Figure 6:
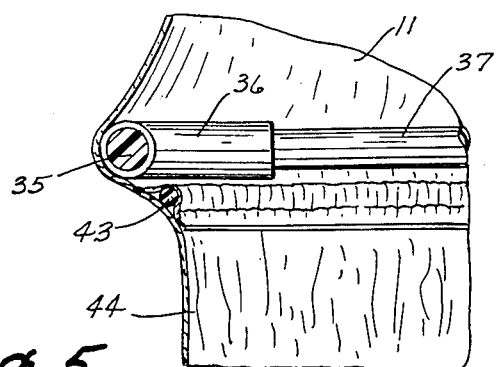
FIG. 6 is an enlarged partial cross sectional view taken along line 6—6 of FIG. 4.

Looking to FIG. 6, it is noted that elastic (43) is secured to the cover (11) below the hoop members (35) and above a skirt (44), which is generally just an extension of the cover (11).

Referring to FIG. 5, it is noted that a sleeve (50) is rotatably attached around the outside of the post (13) and this sleeve (50) has an outwardly extending tubular member (51) thereon which will receive another tube (52). This tube (52) has a sleeve (53) slidably disposed therein and also a set screw (54) is provided for adjusting the height of a wooden table (55) connected to the top of the tube (53). By loosening the set screw (54), the tube (53) can be telescoped into or out from the tube (52) and when the heighth is as desired, the set screw (54) can be tightened to hold the table at such elevation. Similarly, the table can be adjusted for right hand or left hand use by pivoting it and the sleeve (50) from the left side of a person, before they are sitting in the chair, to the right side and vice versa.

Figure 8:
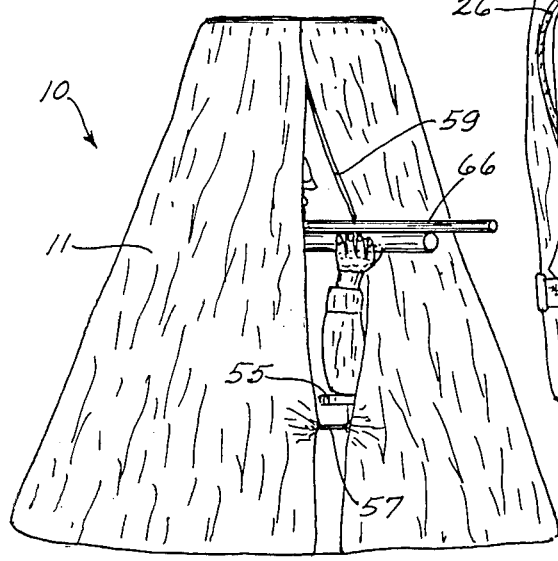
FIG. 8 is a partial front view of the apparatus when used for hunting with a gun.

When it is desired to use the blind, a user would first decide which side of the chair (14) the table (55) is to be disposed and then to move it to that side. The adjustment height of the table can also be taken into account. The front seam of the cover (11) then can be parted and the user can enter the blind and sit on the chair (14). Once inside and on the chair, an elastic member (57) can be utilized to pull the cover tightly together. Then the device can be used, for example as shown in FIG. 1 by extending a camera (58) through opening (59) or a gun (60) through opening FIG. 9 as is shown in FIG. 8.

It is important to note that the front opening (59) must be aligned with the front of the chair (14) when the elastic (43) is stretched over the hoop members (35). That will always allow the person sitting in the chair (14) to have the opening (59) directly in front of him.

When it is desired to disassemble the blind (10) and carry it out of the woods or to a different place to be deployed, the elastic (43) is stretched over the top of the hoop members (35) and the cover (11) is removed and replaced into a bag (61) along with the table parts (52, 53 and 55) and along with the base (12). This is then strapped to the pack frame on top of the chair (14) by an elastic strap (62). The fiberglass members (35) and (37) are stored by extending them into the top of tubes (27) and (34) after first removing the A-shaped member (30) out from the tubes (27) and inserting the lower ends thereof through tubes (33) as shown in FIGS. 7 and 9.

Of course when it is desired to set up the blind (10) again, it is a simple matter of placing the base (12) on the ground, inserting the post (13) thereon as is shown in FIG. 5, moving the A-shaped member (30) from the position shown in FIG. 9 to the position shown in FIG. 2, inserting the wooden disk (33) on post (32a), placing the hoop (35) in place as shown in FIGS. 2, 3 and 4, placing the table (55) in place, reinstalling the cover (11) over the top and pulling the elastic (43) over and below the hoop members (35).

Accordingly, it will be appreciated that the preferred embodiment (10) shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A portable camouflage apparatus for outdoor usage comprising:
   a base adapted to be fixed with respect to the ground;
   a chair having a seat portion and a back portion interconnected together, said chair also having a front and a rear;
   a vertical post attached to said chair and extending downwardly therefrom;
   means for rotatably attaching said post to said base;
   a cloth cover, including a top, a bottom edge, a front and a rear, said front having an opening therein;
   a pack frame means operatively attached to the rear of said chair for selective attachment to a user's back;
   means for supporting the top of said cover, said supporting means comprising at least one support member extending upwardly from said pack frame;
   a hoop extending completely around said post, said cover extending over, around and below said hoop; and
   means for attaching said hoop to said post for supporting said hoop up off of the ground whereby a user can sit in said chair and be concealed by said cover while at the same time being able to rotate the chair and cover about 360 degrees to look in any direction through the opening in the front cover.

2. The apparatus of claim 1 including elastic means attached to said cloth cover below said hoop for pulling said cloth radially inwardly to tighten an upper portion of the cloth cover.

3. The apparatus of claim 2 including a doosky hanging cloth skirt below said elastic means.

4. The apparatus of claim 1 wherein supporting means comprises:
   an A-shaped member having two lower free ends and an upstanding cylindrical member on the top thereof;
   sleeve means for slidingly and selectively receiving the two lower free ends of the A-shaped member when the pack frame means is being utilized to carry said apparatus from place to place; and
   tubular extension means extending upwardly from said pack frame means for selectively slidably receiving the two lower free ends of the A-shaped member when the apparatus is in use with the cloth cover in place over the chair.

5. The apparatus of claim 4 including a circular member rotatably attached to said upstanding cylindrical member for holding the top of the cover radially outwardly from said upstanding cylindrical member.

6. The apparatus of claim 1 including means for biasing said opening in the front of the cloth cover closed.

7. The apparatus of claim 1 including arm rest means operatively pivotally attached to said post and including a horizontal platform for proving an adjustably positionable surface for the user of said apparatus.

8. The apparatus of claim 1 wherein said hoop attaching means includes:
   a plurality of radially extending members attached at one end thereof around the outer surface of said post;
   a plurality of bendable fiberglass rods which have connector means attached thereto for holding the fiberglass rods in a circle; and
   a plurality of rods extending from and selectively connected to said hoop at one end thereof and being selectively connected to said radially extending members at the other end thereof.

9. The apparatus of claim 1 including means for connecting and disconnecting said post from said base.

10. The apparatus of claim 1 wherein said base includes a ground engaging platform disposed entirely above the ground.

* * * * *